United States Patent
Murphy

[11] Patent Number: 6,047,910
[45] Date of Patent: Apr. 11, 2000

[54] COMPOSTING APPARATUS

[75] Inventor: David John Francis Murphy, Maryborough, Australia

[73] Assignee: Universal Greening Pty. Ltd., Brighton, Australia

[21] Appl. No.: 08/970,244

[22] Filed: Nov. 13, 1997

Related U.S. Application Data

[63] Continuation of application No. 08/633,783, filed as application No. PCT/AU94/00635, Oct. 10, 1994, abandoned.

[51] Int. Cl.[7] .................................................... B02C 19/12
[52] U.S. Cl. ........................ 241/21; 241/38; 241/101.763
[58] Field of Search ....................... 56/372; 241/101.762, 241/101.763, 101.77, DIG. 38, 38, 21

[56] References Cited

U.S. PATENT DOCUMENTS

| | | |
|---|---|---|
| 3,791,593 | 2/1974 | Griffin . |
| 4,976,095 | 12/1990 | Schnittjer . |
| 5,001,894 | 3/1991 | Slater . |
| 5,127,589 | 7/1992 | Willibald .......................... 241/101.762 |
| 5,253,467 | 10/1993 | Sims, Jr. . |
| 5,593,888 | 1/1997 | Glaze et al. ................. 241/DIG. 38 X |

FOREIGN PATENT DOCUMENTS

9003196 U   8/1990   Germany .

*Primary Examiner*—Mark Rosenbaum
*Attorney, Agent, or Firm*—Rosenthal & Osha L.L.P.

[57] ABSTRACT

A composting assisting apparatus having a rotatable drum mounted on a support frame. A plurality of blades are mounted on the drum and arranged in a helical path along the axis of the drum. When the drum is rotated, the blades on the drum are rotated in a direction transverse to a forward direction of the support frame to engage, break up and aerate waste.

18 Claims, 5 Drawing Sheets

COMPOSTING APPARATUS

This application is a file wrapper continuation of U.S. application Ser. No. 08/633,783, filed Jun. 25, 1996, filed as PCT/AU94/00635, Oct. 10, 1994, now abandoned.

This invention relates to composting assisting apparatus.

The problem to which this invention is directed relates to the need for efficient and effective promotion of the composting process with respect to existing waste and in particular to municipal solid waste.

According to this invention there is proposed composting assisting apparatus comprising a support frame rotatably supporting a plurality of engaging members the engaging members arranged so as to be jointly rotatable about an axis transversely orientated to a forward direction when the support frame is forwardly advancing, and rotational drive means adapted to rotate the engaging means when the support frame is being caused to be moved forwardly such that waste engaged by the engaging members will be caused to be broken up and to be aerated.

In preference, there are water distribution means adapted to introduce water into the waste during the duration of aeration.

In preference, the engaging means are each in the form of a blade.

In preference, there are at least two rotatable means each supporting the plurality of engaging members so that each will be jointly rotatable about an axis transversely orientated to a forward direction when the support frame is forwardly advancing, and rotational drive means are adapted to rotate the rotatable means in the same rotational direction.

In preference, the engaging members are in the form of blades which are each positioned and shaped such that the rotation results in some of the waste being caused to move from a first outer side toward a middle location and from a second outer side toward a middle location.

In preference, the engaging members are in the form of blades which are each positioned so as to be located on one of at least two helical paths aligned around the respective rotatable axis of the rotating means, an apex of which two helical paths is located at a middle between the outer ends of the rotating means, and the left or right handedness of the respective helical paths being such that as the rotating means rotates, the gap between the successive blades passing a selected point will be wider on most occasions upon each successive passing.

In preference, the direction of rotation of the respective rotating means is such that as the support means moves forwardly, the blades are being caused to move forwardly and upwardly.

In preference, with the engaging members being in the form of a blade and then shaped so as to both cut and throw the material with the same action, there is provided a very powerful mechanism in which the apparatus can present into waste which is laid out in windrows so that the waste can be treated on a regular and rapid basis to maintain adequate air and moisture content for the promotion of maximum aerobic decomposition.

In preference, each engaging member is attached to a drum which comprises the rotatable means and each blade is attached to the drum through a pivotal connection and a shear pin.

In a further form of this invention there is proposed a method for assisting composting which comprises the steps of laying waste in a windrow and then engaging the waste so laid out with a plurality of engaging members which are supported by a support frame which is caused to move forward, such that the engaging means engage the waste so as to break this up and aerate it.

In preference, the method further includes steps of introducing water during the aeration of the waste.

The advantage of introducing water while the waste is being aerated is that the water can be better distributed through the waste in this way rather than for instance pouring the water onto consolidated waste.

This has the significant advantage of reducing the amount of water that is necessary to achieve adequate moisture levels for premium aerobic decomposition, and it also means that the water is more uniformly distributed throughout the waste which leads to more uniform disintegration and composting of the waste.

In a further form of the invention the engaging members can be in the form of flails.

The composting assisting apparatus can further comprise two rotatable means each supporting a plurality of engaging members arranged so that a second of these rotatable means is positioned behind the first and at a somewhat elevated height above a first rotatable means and arranged so as to operate in cooperation with the first rotatable means such that waste being engaged by engaging members on the first rotatable means will be raised so as to also be subsequently handled and aerated by engaging members on the second rotatable means.

The means for rotating the drum may take the form of an engine mounted on the chassis (eg diesel, electric, petrol or LP gas powered engine) together with servicing ancillaries. The engine may be coupled by a drive train, which may be gear and chain, belt, or gear box, to the drum. The drive train may, if necessary include a torque converter.

The engine and ancillaries may be enclosed in a protective cabinet and the quick release coupling is fixed to that part of the chassis also supporting the engine, such that this portion of the apparatus is directly in front of the driver of the propelling vehicle. Advantageously, the cabin of the propelling vehicle may contain a control console allowing the operator to control and monitor all functions of the drum rotating engine, and the water level in the water tank.

The invention will now be described and illustrated with reference to a preferred embodiment depicted in the accompanying drawings, wherein.

Figure 1:
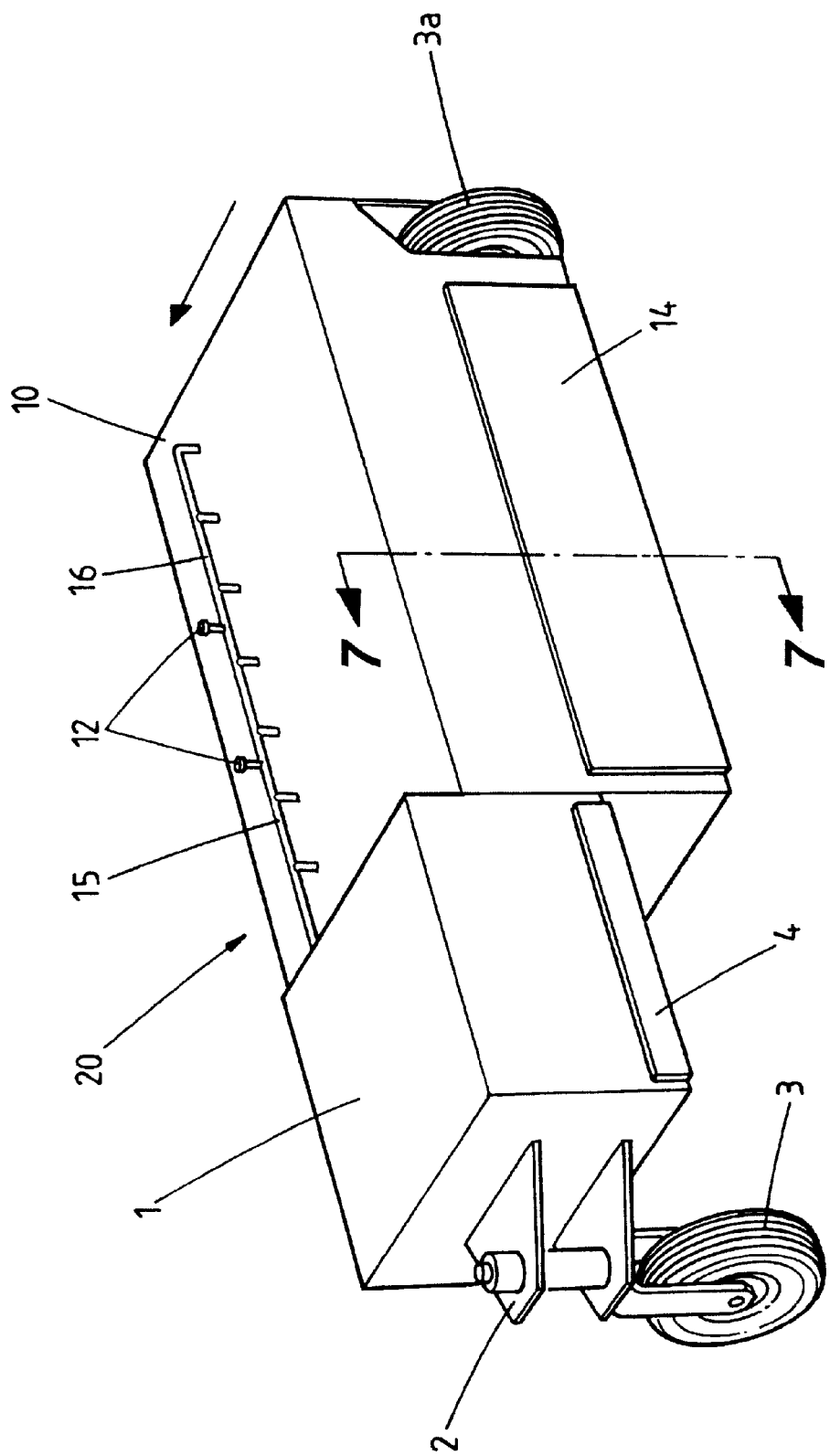
FIG. 1 is an oblique view of a composting assisting apparatus (or composting apparatus for short) according to a first embodiment of the invention.
Figure 2:
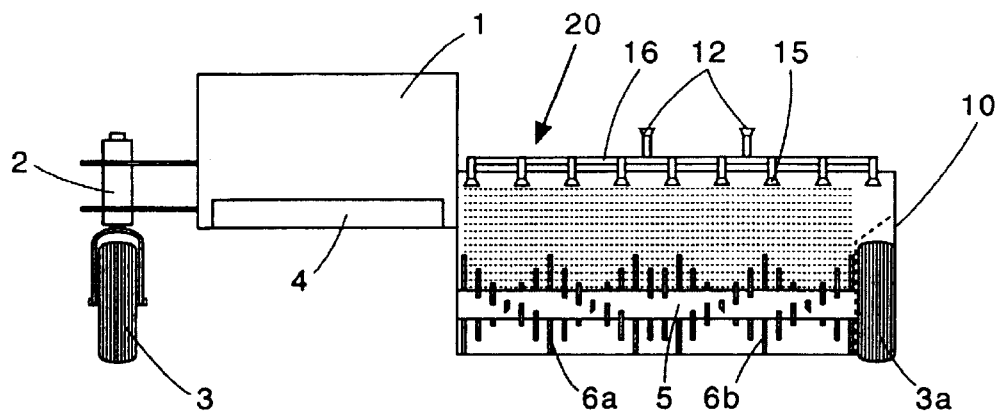
FIG. 2 is a rear view of the apparatus of FIG. 1 (with rear panel and curtain removed, and the secondary drum not shown)
Figure 3:
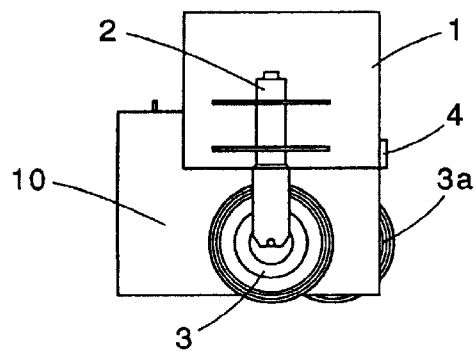
FIG. 3 is a side view of the apparatus of FIG. 1 from the left.
Figure 4:
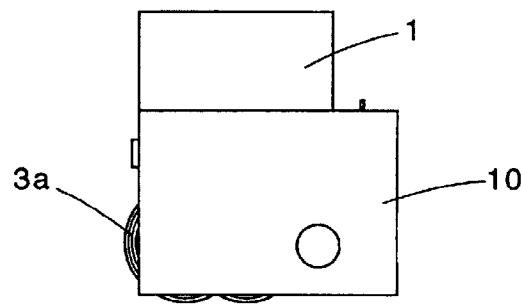
FIG. 4 is a side view of the apparatus of FIG. 1 from the right.
Figure 5:
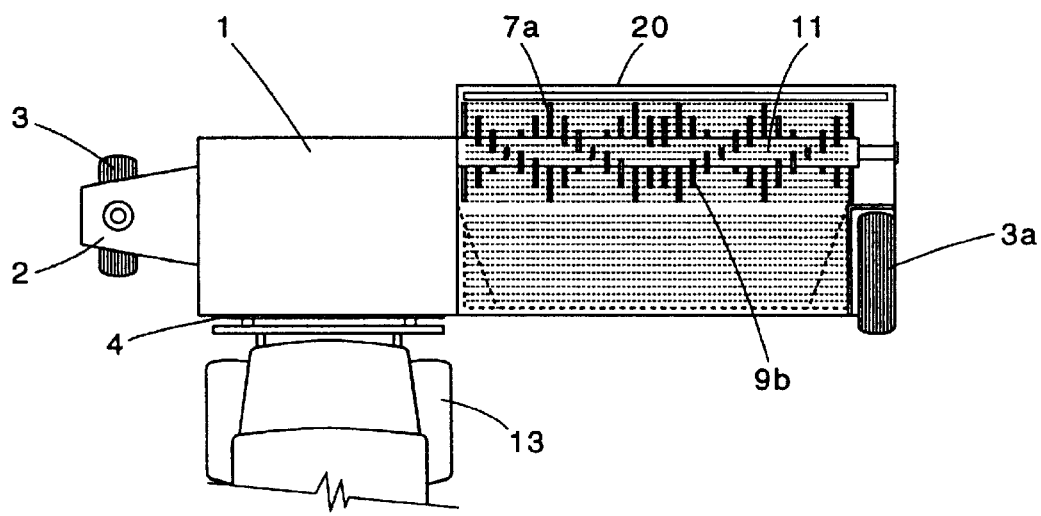
FIG. 5 is a plan view of the apparatus of FIG. 1 (with top panel removed and secondary drum not shown)
Figure 6:
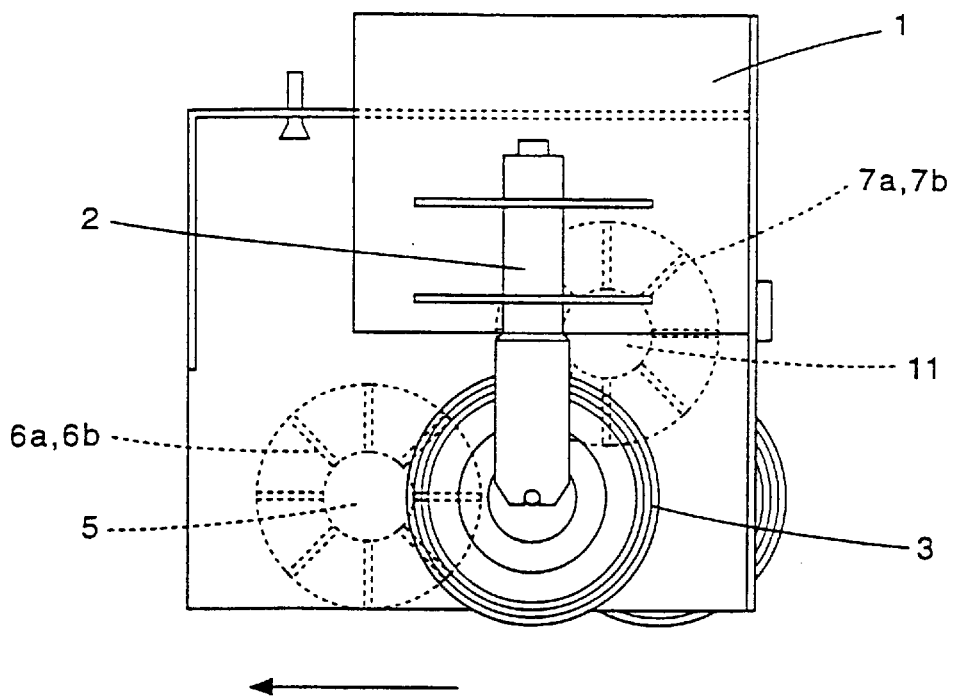
FIG. 6 is a further side view similar to FIG. 3 showing the two drums.
Figure 7:
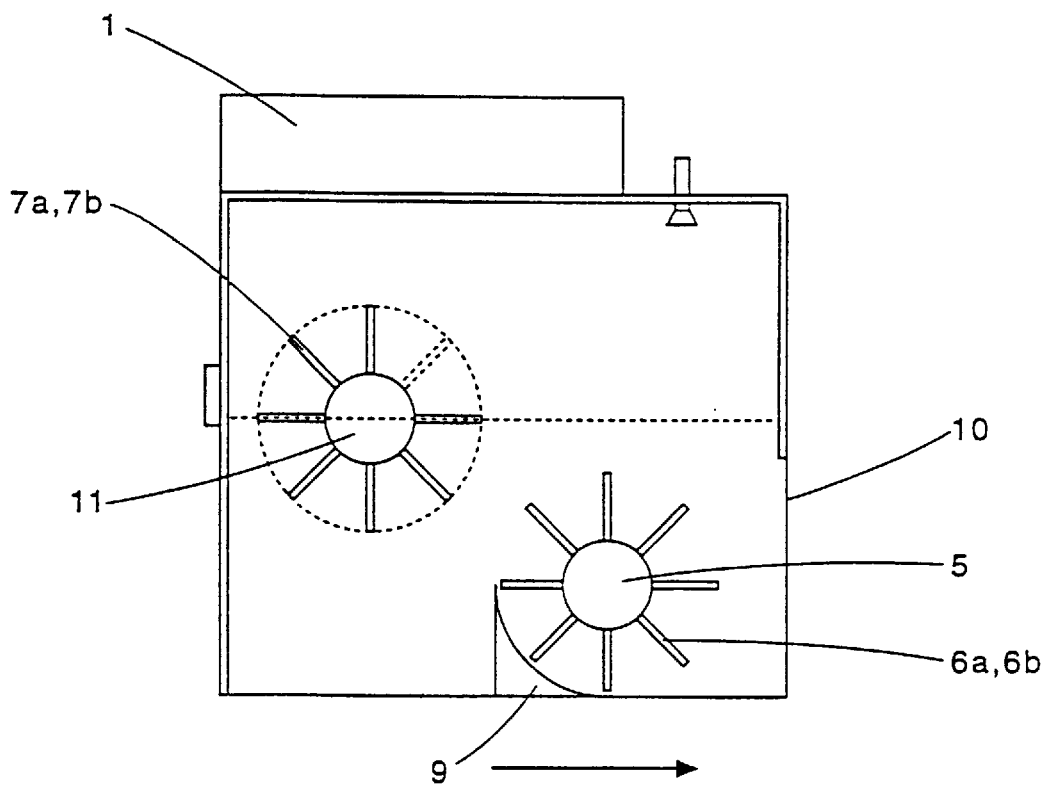
FIG. 7 is a cross sectional view along the lines 7—7 in FIG. 1.

Referring to FIGS. 1–7 of the drawings, a composting apparatus, generally indicated as 20, comprises a chassis (not shown) supported on a pair of wheels (outer and inner) 3, 3a, one of which is mounted on a swivel support 2.

The chassis supports an engine, gear box, radiator and fuel tank (not shown) all housed within the cabinet 1. Located beneath cabinet 1 is a quick release coupling 4 for coupling the chassis to a prime mover 13, eg a water truck or tip truck with a water tank.

Located to one side and somewhat lower than cabinet 1 is a further cabinet 10 housing a drum 5 mounted therein for rotation. Drum 5 has anchored thereon two sets of flails 6a, 6b, each set of flails 6a, 6b, being arranged on one half of the drum 5 along two parallel helical rows, the respective flails in the two rows being relatively staggered. The helical rows on the two halves of the drums 5 are respectively left and right handed. A scraper bar 9 extends along the full length of the drum cabinet 10 beneath the drum 5.

Drum cabinet 10 also houses a secondary drum 11 having the same dimensions as drum 5 but does not extend to the plane of inner wheel 3a as is the case with drum 5. Drum 11 has the same number of flails 7a, 7b and the same disposition of flails as is the case with drum 5.

Drum cabinet 10 is also provided with a flexible curtain 14 at the rear thereof.

On the top of drum cabinet 10 are provided a plurality of water outlets (spray nozzles) 15 connected via a flexible pipe 16 to a water tank (not shown) located on prime mover 13, via quick coupling 12.

From the apparatus described above, the following advantages of the invention will be apparent:

1. The flails are set in two groupings, being left and right handed and are so arranged that those to the left of centre throw to the right and those right of centre throw to the left.

This has the effect of constantly exchanging right for left as well as inversion as the drum is moved through the windrow. The benefit is a much more thorough blending and homogenising of the material, together with a more effective aeration. The sharpness and toughness of the blades effects the shredding.

2. According to a preferred embodiment, moisturising is effected in situ. No existing apparatus provides the facility of "moisturising and turning" simultaneously. By introducing water into the windrow at a controllable rate, as it is tumed, the water usage and leachate problems are reduced, the mixing of the water becomes better effected and the process therefore accelerated.

3. According to a further preferred embodiment, propulsion is effected by a prime mover which can be detachably attached to the chassis of the composting apparatus where the prime mover also serves as the water supply. Propulsion of existing machines through the windrows is either by self propulsion or by front end loader. Self propelled machinery is necessarily more expensive than that which relies on an external source of propulsion. However, existing apparatus which utilises a tractor/front end loader, also require the services of a water tanker. In this case, the combined apparatus on the one hand may exceed the capital value of the self propelled apparatus on the other.

According to the above embodiment:
the capital cost of the composting apparatus is reduced because it needs no expensive drive train, steering mechanism, or facilities for the plant operator;
no dedicated operator is required for the composting apparatus;
in the event of mechanical failure of the composting apparatus, it can be lifted vertically from the windrow by means of the lifting capacity of the forklift mast, carried to the service area, repaired and returned to the windrow with minimum delay. Other apparatus suffering mechanical failure needs to be first dug free from the windrow and then towed or carried by special vehicle to the service area which is a far more expensive and time consuming operation;
by his position in the propelling vehicle cabin, the driver can maintain vigil over the effectiveness of the turning operation and may vary the speed of travel through the windrow and/or the speed or rotation of the flail;

According to a second embodiment of the present invention, the use of a water tanker as the prime mover, which need not be a dedicated tanker, but a tank-carrying tip truck, reduces the capital cost of machinery by almost half.

4. Using this embodiment of the invention, viz. the forklift-type fitting attached to the prime mover, transportation, inter and intra-site can be achieved with no further addition to plant other than a trailer. Thus a complete composting system, needing one operator only is provided by this apparatus, through the composting apparatus being manipulated by the forklift-type fitting on the front of the truck. This fitting may be of the three stage type so that when retracted the driver's vision is not obstructed in highway driving. Once the composting work is completed, the apparatus can be transported by the prime mover to a trailer, lifted and placed aboard in a quick release hitch disengage.

The prime mover can then hitch the trailer, and after securing the composter in place, the whole plant can be transported to another site, unloading being by simply the reverse of the loading procedure. In the case of existing apparatus which is self-propelled, a crane may be necessary for loading and unloading, while over-dimensional transport equipment requiring special permits for transportation to alternative sites, may be required.

Figure 8:
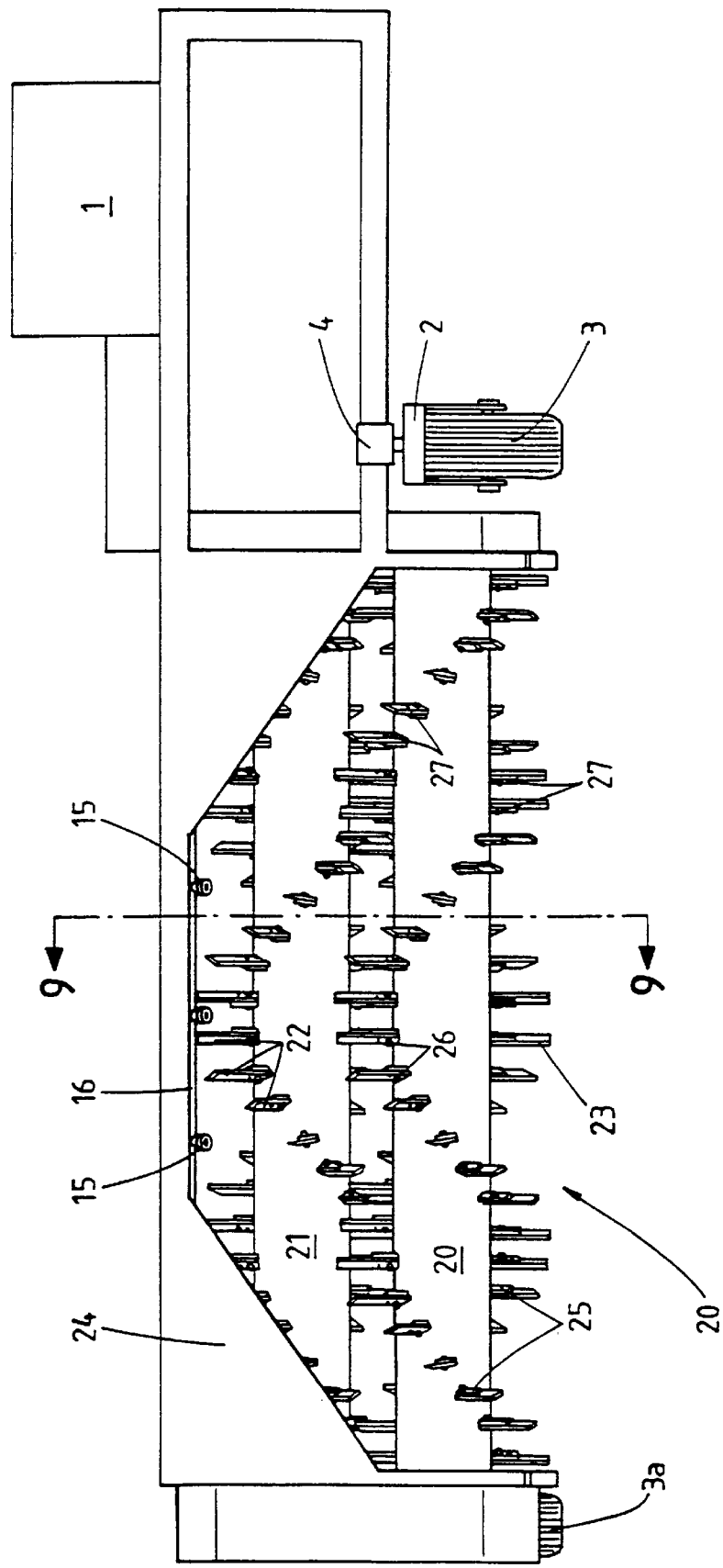
FIG. 8 is a view from the front of an apparatus according to a second embodiment of the invention.
Figure 9:
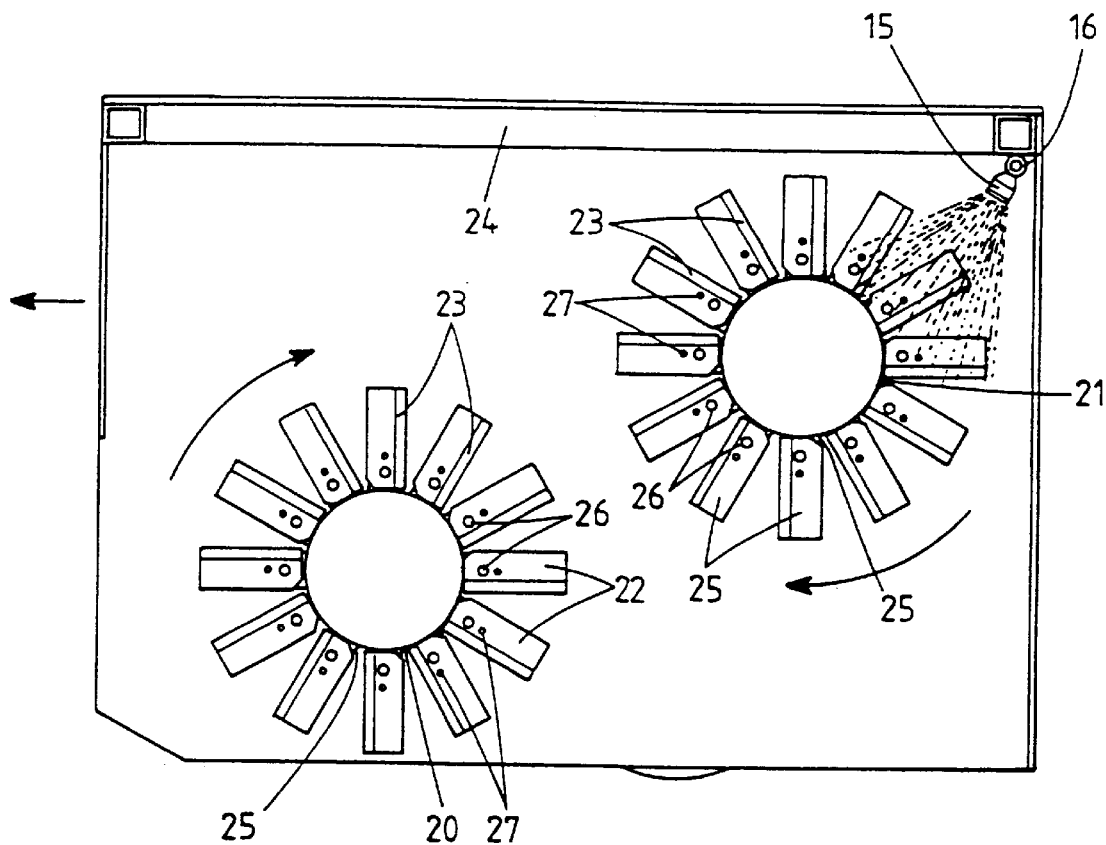
FIG. 9 is a cross sectional view along the lines 9—9 in FIG. 8.
Figure 10:
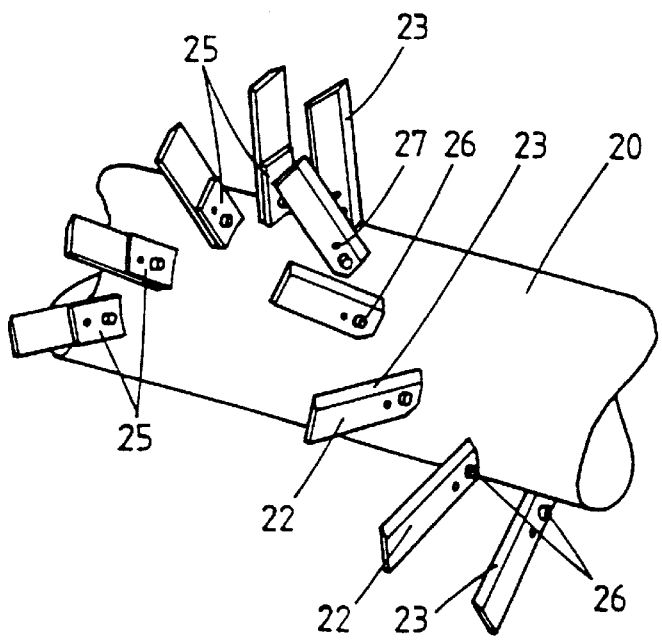
FIG. 10 is a somewhat enlarged perspective view of the rotatable drum on the plurality of engaging members namely blades held so as to be at an offset angle to a forwardly rotating direction.

According to the embodiment described in FIGS. 8, 9 and 10, the support arrangement for the engaging members is generally the same as in the first embodiment including a rotatable drum shown in this case as 20 and 21.

The addition in the embodiment illustrated in FIGS. 8–10 includes blades 22 the shape and effect and position being such that the waste is more effectively engaged and effectively thrown to affect the aeration. Each of the blades 22 has a shape which is generally of a planar shape and of rectilinear external proportions, and has a leading edge shown at 23 which is sharpened so as to assist in breaking through and cutting parts of the waste material.

As well, while the blade itself is directed perpendicularly to the axis of the drum 20 or in the case of the drum 21 from this axis as well, the orientation of the leading face is offset in the manner of the blade so as in this case to be 10° to the plane vertical to the forwardly advancing direction to the support frame 24.

Further, each blade 22 is attached to the drum 20 and 21 through a support bracket 25 which is directly welded to the respective drum 20 and 21. Each blade 22 is attached to the bracket 25 by having both a bolt 26 and a shear pin 27 passing mutually therethrough.

Such an arrangement allows for each blade 22 to be individually removable in the event of damage and if unduly high forces prevail each blade 22 can release some pressure by shearing the respective shear pin 27 allowing the blade 22 to pivot about the more inwardly located and stronger bolt 26.

As shown in the first embodiment, with this arrangement also, the apparatus is caused to move forwardly into an extending windrow of municipal waste, and the blades 22 and 25 are caused to rotate so that as the support frame 24 moves forwardly, the blades 22 and 25 as they come to a front of the support frame 24 will be caused to move forwardly and upwardly into the presented waste.

Such an arrangement causes the waste to be elevated and aerated and furthermore because the orientation of the offset of each blade is set as described this being the most generally seen in FIG. 8, the waste being encountered on the right hand side will be thrown toward a central location and likewise the waste being encountered by the blades on the left hand side will also be thrown towards a central location.

In summary then it could be said that the support frame 24 rotatably supports a plurality of helically aligned and individually inclined blades 22 arranged on two parallel drums 20 and 21 so as to be rotatable about an axis transversely orientated to a forward direction when the support frame 24 is forwardly advancing, and there are means 15 and 16 to introduce water into waste at locations where the waste will be airborne from the effect of the blades 22, rotational drive means arranged to rotate the blades 22 when the support frame 24 is being caused to be moved forwardly altogether such that waste engaged by the blades 22 will be caused to both broken up, aerated and directed toward a centre location as the support frame moves forwardly.

The blades 22 are supported such that they are arranged to follow helical paths with contrahand orientations meeting in a centre so that the distance between the blades will successively increase past any point the result of this being to assist at least to some extent the unnecessary double encountering of the same rubbish by successive blades.

This has the result of causing the waste to be directed through each pass into a centre area keeping a reasonable windrow width.

What is claimed is:

1. A composting assisting apparatus, comprising:
   a pair of rotatable members;
   a support frame supporting the rotatable members such that one rotatable member is positioned behind and at an elevated height relative to the other rotatable member;
   a plurality of engaging members mounted on each rotatable member, the engaging members on at least one rotatable member being positioned along at least one helical path around a longitudinal axis of the rotatable member; and
   a rotational drive for rotating the rotatable members about an axis transverse to a direction of movement of the support frame such that waste engaged by the engaging members on one rotable member is raised and subsequently engaged by the engaging members on the other rotatable member to break up and aerate the waste.

2. The composting assisting apparatus of claim 1, wherein the engaging members on each rotatable member are positioned along two parallel spaced apart helical paths around the longitudinal axis of each rotatable member.

3. The composting assisting apparatus of claim 1, further comprising outlets for introducing fluid into the waste during aeration.

4. The composting assisting apparatus of claim 1, wherein the engaging members comprise blades.

5. The composting assisting apparatus of claim 4, wherein the rotational drive rotates the rotatable members in a direction such that the blades move forwardly and upwardly as the support frame moves forward.

6. The composting assisting apparatus of claim 4, wherein the blades are shaped to both cut and throw waste in a single rotation.

7. The composting assisting apparatus of claim 4, wherein each rotatable member comprises a drum, and the blades are attached to each drum through a pivotal connection and a shear pin.

8. The composting assisting apparatus of claim 1, wherein the engaging members on each rotatable member are positioned and shaped such that waste engaged by the engaging members is moved along the longitudinal axis of each rotatable member toward a middle of each rotatable member.

9. The composting assisting apparatus of claim 1, wherein the engaging members on each rotatable member are positioned along a right-handed helical path and a left-handed helical path around the longitudinal axis of each rotatable member, the right- and left-handed helical paths meeting at a middle of each rotatable member such that waste engaged by the engaging members on each rotatable member is moved along the longitudinal axis of each rotatable member toward the middle of each rotatable member.

10. The composting assisting apparatus of claim 9, wherein the engaging members on each rotatable member are positioned along the right- and left-handed helical paths in such a way that a space between successive engaging members decreases as the distance from the middle increases.

11. The composting assisting apparatus of claim 1, wherein the engaging members comprise flails.

12. The composting assisting apparatus of claim 1, wherein the engaging members on each rotatable member are positioned along at least one helical path around the longitudinal axis of each rotatable member.

13. A method for assisting composting, comprising:
   rotating a first and a second rotatable member supported by a support frame in a direction transverse to a forward direction of the support frame, the second rotatable member positioned behind and at an elevated height relative to the first rotatable member, a plurality of engaging members mounted on the first and second rotatable members and positioned along at least one helical path around a longitudinal axis of at least one rotatable member;
   engaging waste in a windrow with the engaging members to break up and aerate the waste and move it along the longitudinal axis of each rotatable member; and
   moving the support frame forward.

14. A method of assisting composting as in claimed 13, further comprising introducing water into the waste during aeration.

15. A composting assisting apparatus comprising:
   a first and second elongate rotatable member;
   a plurality of blades for engaging and aerating the material to be composted, the blades mounted on the first and second rotatable member and arranged in at least two helical rows on each of two longitudinal halves of the first and second rotatable members, the helical rows on corresponding longitudinal halves being opposite in sense such that, in use, compost engaged by the blades at an end of each of the rotatable members is moved toward a center of the rotatable members, the blades shaped and positioned to cut the material to be composted and move it inwardly while aerating it;
   a wheeled support frame adapted to be moved in a direction of movement and supporting the first and second rotatable members for rotation about a substantially horizontal axis transverse to the said direction of movement, wherein the second rotatable member is arranged parallel to, rearwardly of and above the first rotatable member such that material engaged by the blades on the first rotatable member is subsequently engaged by the blades on the second rotatable member; and drive means connected to rotate both rotatable members in a direction such that the front portion of the rotatable members, in the said direction of movement, moves upwardly.

16. The composting assisting apparatus of claim 15, further comprising water distribution means for introducing water into the material to be composted while the material is aerated.

17. The composting assisting apparatus of claim 16, wherein each rotatable member comprises a drum and each blade is attached to the associated drum by a pivotal connection and a shear pin.

18. The composting assisting apparatus of claim 15, wherein each rotatable member comprises a drum and each blade is attached to the associated drum by a pivotal connection and a shear pin.

* * * * *